(12) United States Patent
Gooding

(10) Patent No.: US 8,880,329 B2
(45) Date of Patent: *Nov. 4, 2014

(54) ROUTE PLANNING USING LOCATION/TIME ENCODED DATA FROM LOCATION AWARE SNOWPLOWS

(75) Inventor: Thomas M. Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/179,985

(22) Filed: Jul. 11, 2011

(65) Prior Publication Data
US 2013/0018577 A1 Jan. 17, 2013

(51) Int. Cl.
- G01C 21/36 (2006.01)
- G06F 7/70 (2006.01)
- G06F 19/00 (2011.01)
- G06G 7/00 (2006.01)
- G06G 7/76 (2006.01)
- G08G 1/09 (2006.01)
- H04M 11/04 (2006.01)
- G01C 21/34 (2006.01)

(52) U.S. Cl.
CPC ........ G01C 21/3407 (2013.01); G01C 21/3461 (2013.01); G01C 21/3691 (2013.01)
USPC ............. 701/400; 701/50; 701/415; 701/423; 701/468; 455/404.1; 340/905

(58) Field of Classification Search
CPC ........... G01C 21/3407; G01C 21/3461; G01C 21/3691
USPC ........................................................ 701/415
See application file for complete search history.

(56) References Cited

U.S. PATENT DOCUMENTS 6,175,803 B1 * 1/2001 Chowanic et al. ............ 701/533
6,356,839 B1 * 3/2002 Monde et al. ................. 701/415

(Continued)

FOREIGN PATENT DOCUMENTS

EP 1901258 B1 11/2010

OTHER PUBLICATIONS

Strong, Christopher et al., "State-of-the-Practice of Automatic Vehicle Location for Winter Maintenance Operations," Transportation Research Board 86th Annual Meeting, Jan. 2007, Transportation Research Board of the National Academies, Washington, DC, United States.

(Continued)

Primary Examiner — Fadey Jabr
Assistant Examiner — Lail Kleinman
(74) Attorney, Agent, or Firm — Patterson & Sheridan, LLP

(57) ABSTRACT

Techniques are described for using geographic location data of snowplows to update a snow depth associated with a section of a surface street. The route of the snowplow may be tracked continuously which allows the snow depth of the street to be reset in real-time. The updated snow depth may then be used to generate a cost of travelling on the street. The travelling cost may then be used to plan a route through the region. Alternatively, the cost may be graphically displayed on a map to permit a user to determine which surface streets to avoid. In another embodiment, the cost of travelling on a particular street may be changed by the attributes of the vehicle that will navigate the snow-covered roads, driver's experience, or the geographic terrain of a road. This new cost may then be used, for example, to plan a route or display roads to avoid.

14 Claims, 6 Drawing Sheets

(56) References Cited

U.S. PATENT DOCUMENTS

| | | | |
|---|---|---|---|
| 6,377,881 B1* | 4/2002 | Mullins | 701/50 |
| 8,275,522 B1 | 9/2012 | Groeneweg et al. | |
| 2005/0085257 A1* | 4/2005 | Laird et al. | 455/550.1 |
| 2010/0076685 A1 | 3/2010 | Eidehall | |
| 2010/0161222 A1 | 6/2010 | Zhang | |
| 2011/0153742 A1* | 6/2011 | Sloop et al. | 709/204 |
| 2013/0080052 A1 | 3/2013 | Gooding | |

OTHER PUBLICATIONS

Veneziano, David et al., "Pilot Test of Automatic Vehicle Location on Snow Plows," Technical Memorandum 2: Pre-Pilot Test Results, Western Transportation Institute, Jul. 17, 2007, Montana State University College of Engineering, Bozeman, MT, United States.

Strong, Christopher et al., "Pilot Test of Automatic Vehicle Location on Snow Plows," Technical Memorandum 1: Recommendations for Pilot Test, Western Transportation Institute, Sep. 2005, Montana State University College of Engineering, Bozeman, MT, United States.

Gattuso, Nicole et al., "McHenry County Implements GIS Technology to Enhance Snow Plow Application," American Public Works Association, Oct. 2005, <http://classic.apwa.net/Publications/Reporter/ReporterOnline/index.asp?DISPLAY=ISSUE&ISSUE_DATE=102005&ARTICLE_NUMBER=1147>.

* cited by examiner

ROUTE PLANNING USING LOCATION/TIME ENCODED DATA FROM LOCATION AWARE SNOWPLOWS

BACKGROUND

1. Field of the Invention

Embodiments of the invention are generally related to tracking the snow depth on surface streets. And more specifically, embodiments are related to techniques for updating a cost for traveling on a road and the snow depth based on the location of a snowplow.

2. Description of the Related Art

Current technologies permit a user to plan a route between two geographic locations based on certain factors such as distance, shortest travel time, type of preferred roadways, and the like. Route planning systems use an algorithm that balances one or more of these factors to produce a score (or a traveling cost) for each street. The street or streets with the most favorable score are the ones displayed to the user as the suggested route. A navigational system may then use global positioning system (GPS) satellites to guide the user through the route.

Many of these algorithms, however, do not consider real-time information when planning a route. This limitation ignores the dynamic nature of road conditions. For example, a route planning system may assign the same score to a segment of a road even if that section of the road is currently experiencing inclement weather. The accumulation of snow on a road surface, for example, may drastically change the road's navigability.

SUMMARY

Embodiments of the invention provide a method, a system and a computer program product which include receiving location data associated with a vehicle. Moreover, the vehicle is equipped to remove frozen precipitation from a surface. The method, system, and computer program product generate a traveling cost for at least a portion of the surface. The cost of travel is based on the location data. The method, system, and computer program product transmit to a display device at least one of (i) map data that associates the traveling cost to a particular geographic location and (ii) a planned route based on the traveling cost.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
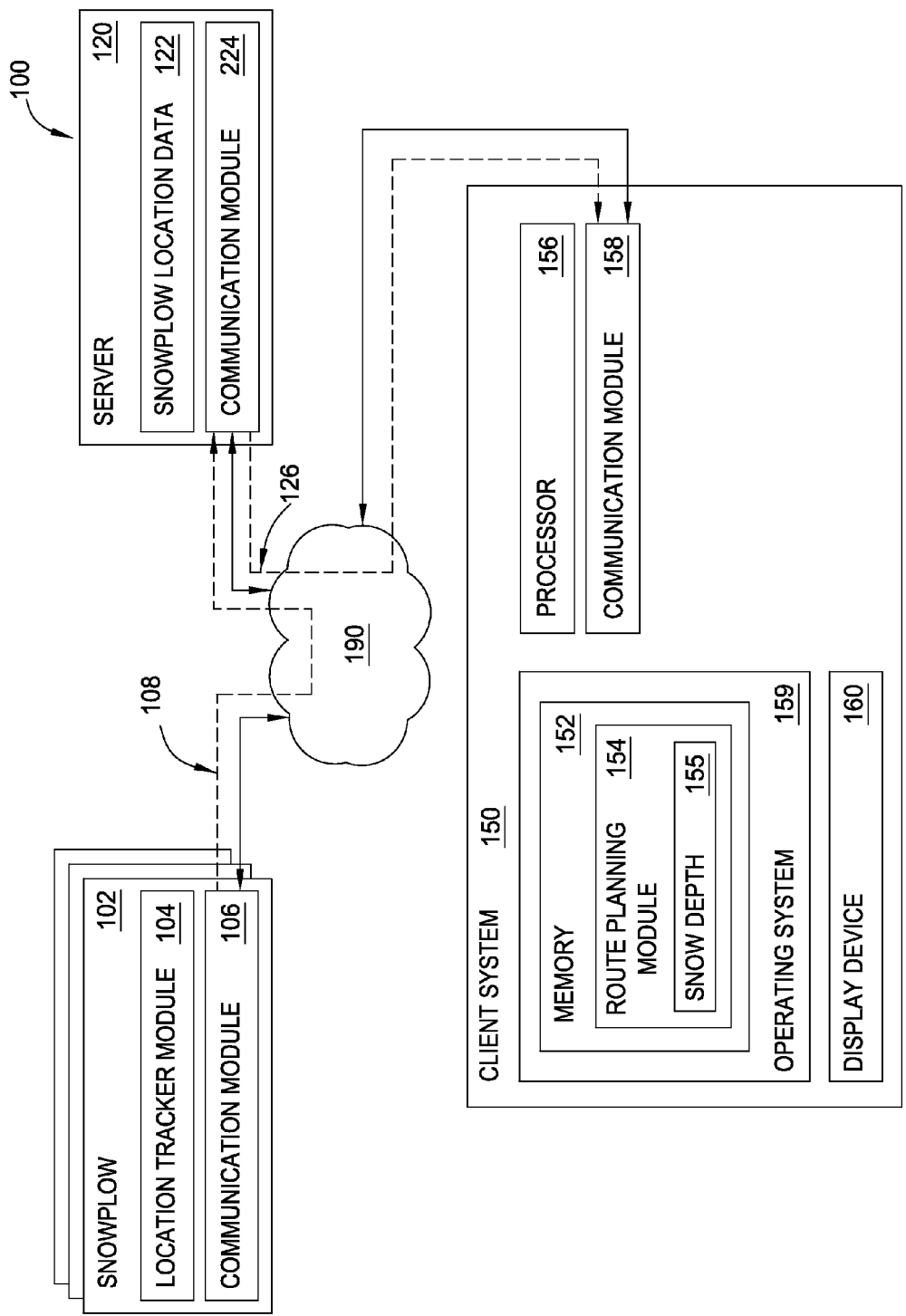
FIG. 1 is a block diagram of a system for calculating a snow depth for snow-covered roads, according to one embodiment of the invention.

Embodiments of the invention generally provide techniques for using location data associated with one or more snowplows to plan a route or provide current snow depth data to a user. Currently, navigational systems, such as GPS units, mobile phones, route planning websites, and the like, lack the ability to dynamically monitor snow depth based on current and historical locations of snowplows. Doing so, however, allows the navigational system to update a displayed map or generate a planned route that reflects the current amount of frozen precipitation covering a road.

As used herein, frozen precipitation is a substance that includes, at least in part, water in a solid state—e.g., ice, snow, hail, or slush. Any of these examples of frozen precipitation may be used interchangeably herein. A snowplow is any vehicle that clears frozen precipitation off a road's surface. In one embodiment, the snowplow has a plow attached to the vehicle which scrapes the frozen precipitation from the road's surface.

In one embodiment, the current snow depth for surface streets in a certain geographic region is found based on measured snow depth, weather forecasts, Doppler radar, and the like. The location of the snowplows may also be tracked by a location aware device and used to update the current snow depth. For example, the snow depth may be reset to zero if a snowplow has recently cleared the surface street. The updated snow depth is then used by a navigational system to assign a cost to different sections of roads in the region. This cost may be combined with other costs such as distance between two geographic points, type of road, speed limits, and the like to determine the best route for travel. Alternatively, the current snow depth may be displayed to a user on a map of the geographic region. For example, the road sections that have the greatest snow depth (or highest cost) may be highlighted red while the sections with the least snow depth are highlighted green.

In another embodiment, attributes of the vehicle that affect the vehicles performance in snow may be considered. Certain types of vehicles are generally better equipped to safely navigate snow-covered roads than others. For example, an all-wheel drive vehicle provides greater traction on frozen precipitation than a similar front-wheel drive vehicle. Moreover, snow tires or snow chains may also provide additional traction. All of these factors may be considered when formulating a cost of a section of a road. For example, even if a road has been plowed more recently than another, the navigational system may recommend the less recently plowed road to a vehicle that is well equipped to navigate snow-covered roads.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a snowplow tracking module) or related data available in the cloud. For example, the snowplow tracking module could execute on a computing system in the cloud and generate a route taken by a snowplow. In such a case, the snowplow tracking module could generate the snowplow's route and store the route at a storage location in the cloud. Doing so allows a user to access this information from any computing system attached to a network connected to the cloud (e.g., the Internet).

FIG. 1 is a block diagram of a system used for calculating a snow depth for snow-covered roads, according to one embodiment of the invention. The system 100 includes at least one snowplow 102, a server 120, at least one client system 150, and a communication system 190. The snowplow 102 includes a location tracker module 104 and a communication module 106. The location tracker module 104 collects and maintains a route history of the snowplow 102—i.e., what surface streets the snowplow 102 has cleared. The location tracker may use any means of tracking a vehicle's path such as a global positioning system (GPS), location-based service, mobile positioning (e.g., GSM localization), checkpoints, driver input, and the like. The communication module 106 transmits the route history (as well as a current location) of the snowplow 102 to the communication system 190. The dotted line illustrates that the route history is sent via the communication system 190 to the server 120. In one embodiment, the communication module 106 may instead transmit the route history directly to the client system 150.

The server 120 includes snowplow location data 122 and communication module 124. The server 120 may receive the route history of the one or more snowplows 102 via the communication system 190 which is then stored as snowplow location data 122. In one embodiment, the server 120 may use a known schedule or predefined route of the snowplow 102 rather than receiving information directly from the snowplow 102. For example, if a snowplow driver is assigned a particular route, the server 120 may store that assignment as snowplow location data 122 in lieu of communicating with the snowplow 102. The communication module 124 transmits the snowplow location data 122 to the client system 150. The dotted line 126 illustrates the path traversed by the snowplow location data 122 through the communication system 190. Data path 126 may use the same or a different type of communication system 190 used by the data path 108—e.g., radio communications or TCP/IP.

The client system 150 includes a memory 152, processor 156, display device 160, and communication module 158. Computer processor 120 may be any processor capable of performing the functions described herein. Furthermore, as will be understood by one of ordinary skill in the art, any computer system capable of performing the functions described herein may be used.

The memory 152 includes operating system 159 and a route planning module 154. Although memory 152 is shown as a single entity, memory 152 may include one or more memory devices having blocks of memory associated with physical addresses, such as random access memory (RAM), read only memory (ROM), flash memory or other types of volatile and/or non-volatile memory. The operating system 159 may be any operating system capable of performing the functions described herein. In one embodiment, the route planning module 154 uses the snowplow location data 122 to calculate the snow depth 155 associated with at least a section of a surface street. For example, as the snowplow 102 clears a section of a street, the associated snow depth 155 is updated accordingly. The route planning module 154 may then use the snow depth 155 for each road section to plan a route between two geographic points. Alternatively, the route planning module 154 may use the snow depth 155 to display on a map the different depths of snow on the road. Using the snowplow location data 122, weather forecasts, Doppler radar, and the like, the route planning module 154 may update the snow depth 155 associated with a section of a surface street found within a geographic region.

In another embodiment, the server 120 may generate the planned route or snow-depth map which is transmitted to the client system 150 for display. That is, the route planning module 154 and snow depth 155 may be located on the server 120 (or distributed on multiple servers) which then transmits to the client system 150 data representing the planned route or augmented map for display. For example, the server 120 may use the snowplow location data 122 to generate a cost of traveling in a region. This cost may be associated with a specific geographic location (i.e., a portion of a street) and then sent to the client system 150 for display on map in the display device 160.

Display device 160 may be any apparatus capable of visual display such as a computer monitor, cell phone display, display screen of a portable GPS unit, and the like. The display device 160 receives the planned route or augmented map transmitted by the route planning module 154 and displays it for the user. In one embodiment, the display device 160 is not integrated with the client system 150 but may be part of a separate system (not shown).

The communication module 158 receives and transmits data to and from the communication system 190. The communication modules 106, 124, and 158 may be network adapters, transceivers, antennas, and the like.

The communication system 190 may be a computer network (e.g., the Internet), a communication method using electromagnetic waves (e.g., infrared light or radio waves), satellite communications, and the like.

Figure 2:
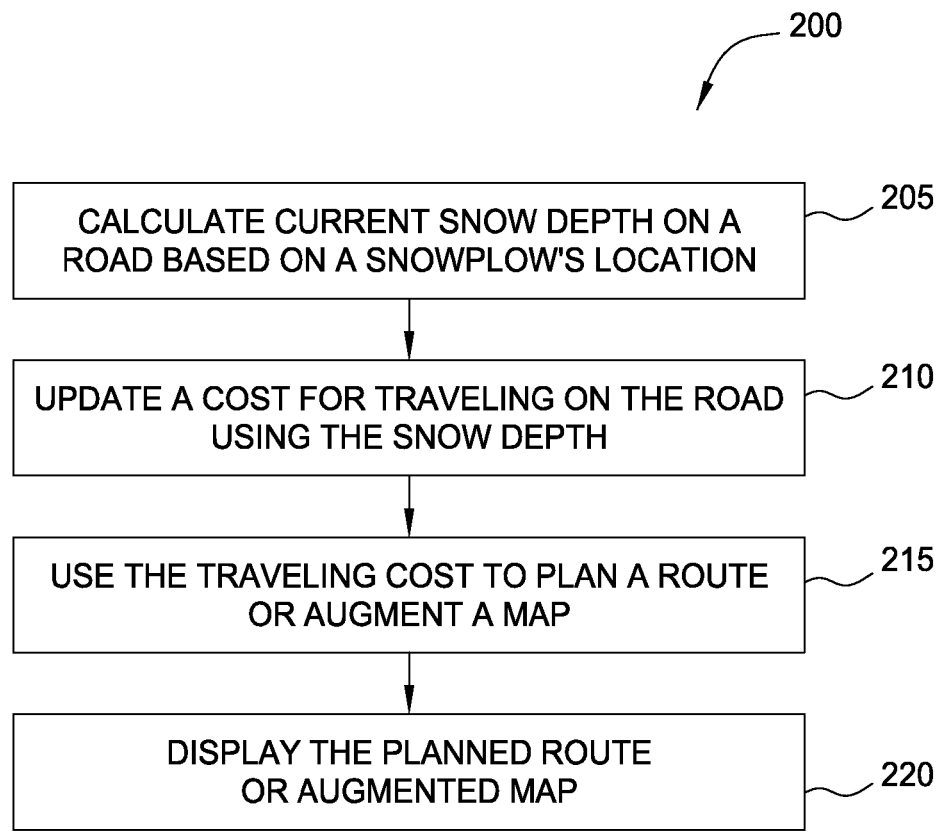
FIG. 2 is a flow diagram illustrating a method of calculating a snow depth for snow-covered roads, according to one embodiment of the invention.

FIG. 2 is a flow diagram illustrating a method of calculating a snow depth for snow-covered roads, according to one embodiment of the invention. The method 200 determines a current snow depth for a section of road within a certain geographic region. The depth is then used to calculate a cost for traveling on that section of road.

At step 205, the route planning module 154 calculates the current snow depth 155 on a section of the road. The route planning module 154 may receive snow depth data from weather forecasts, government informational databases, Doppler radar, snow measuring equipment, or extrapolate the depth based on snowfall rates. For example, the client system 150 may receive from a weather forecast the amount of snowfall that was produced by a storm in a certain region—e.g., within a city's limit. Alternatively, snow measuring equipment (e.g., snow sampling tubes) may constantly send to the client system 150 an updated measurement of snow that has fallen. The route planning module 154 may then assume that a region surrounding the geographic location of the snow measuring equipment shares the same snow depth 155—e.g., the streets within a five mile radius of the equipment are assigned that snow depth 155. Or the client system 150 may receive information about snow depth 155 from a multiple sources and use those sources to generate a gradient snow-depth map for increased granularity. Increased granularity may aid the route planning module 154 to correctly measure the snow depth 155 if a certain region has varying elevations or environmental conditions—for example, a lake effect—that produce significantly different snow depths within the region.

The route planning module 154 may make further refinements for the snow depth 155 to account for snow accumulation on surface streets. For example, snow accumulation on surface streets may be less than the measured accumulation if the temperature of the roads is above freezing. Thus, it may take several hours of snowfall before snow actually begins to accumulate on the roads. The route planning module 154 may monitor and account for this temperature disparity when assigning the current snow depth 155 for a section of a surface street. For example, the route planning module 154 may wait until a threshold amount of snow has fallen or until outside temperatures have decreased to a certain temperature to begin increasing the snow depth 155. In another embodiment, the route planning module 154 may adjust the snow depth 155 based on the amount of traffic on a surface street. Because vehicles traveling on snow tend to compact the snow, streets with greater traffic may have smaller snow depths. The route planning module 154 may also consider the compactness of the snow (or the traffic density) when generating a cost—e.g., a busy street covered with compacted snow may be assigned a smaller cost than an untraveled street since it may have a smaller snow depth.

In another embodiment, the client system 150 may receive snow depth data that was pre-generated by a third-party such as a government organization. The route planning module 154 may assign this pre-generated data as an initial snow depth 155 without additional calculations.

One or more snowplows 102 may transmit their current or previous locations to the route planning module 154. The planning module 154 may then use the location to update the snow depth 155. Moreover, a snowplow 102 may transmit location data to the client system 150 only if it is currently removing frozen precipitation from a road rather than merely in transit. The snowplow location data 122 may then be used to reset the current snow depth 155 associated with a surface street that was recently plowed.

In one embodiment, if the snowplow 102 traverses a section of a road, the associated snow depth 155 is reset to zero. However, in other embodiments, the snow depth 155 may reset to a non-zero number. For example, for roads with constant vehicular traffic, a snowplow may be unable to completely clear off the compacted snow. Also, the texture of a road surface—e.g., a rough surface—may prevent a plow from entirely removing the snow.

At step 210, the route planning module 154 may use the snow depth 155 to calculate a cost of traveling on the portion of the road. Specifically, the route planning module 154 may set the snow depth 155 to an initial depth that was measured by any of the techniques discussed above. The cost may increase proportionally (i.e., linearly)—e.g., a half of inch of snow generates a cost score of 25 while a full inch yields a cost score of 50—or exponentially with the measured snow depth. Further, the cost may asymptotically approach a maximum cost when the snow depth 155 makes a road impassable. Accordingly, any snow depth 155 above that measurement would yield a similar cost score. For example, if ten inches of accumulated snow make the road impassable, a snow depth of twenty inches may be assigned substantially the same cost as a snow depth of ten inches.

To reset the snow depth 155 based on the movements of a snowplow 102, the route planning module 154 determines from the snowplow location data 122 the route traversed by the snowplow 102.

Figure 3A:
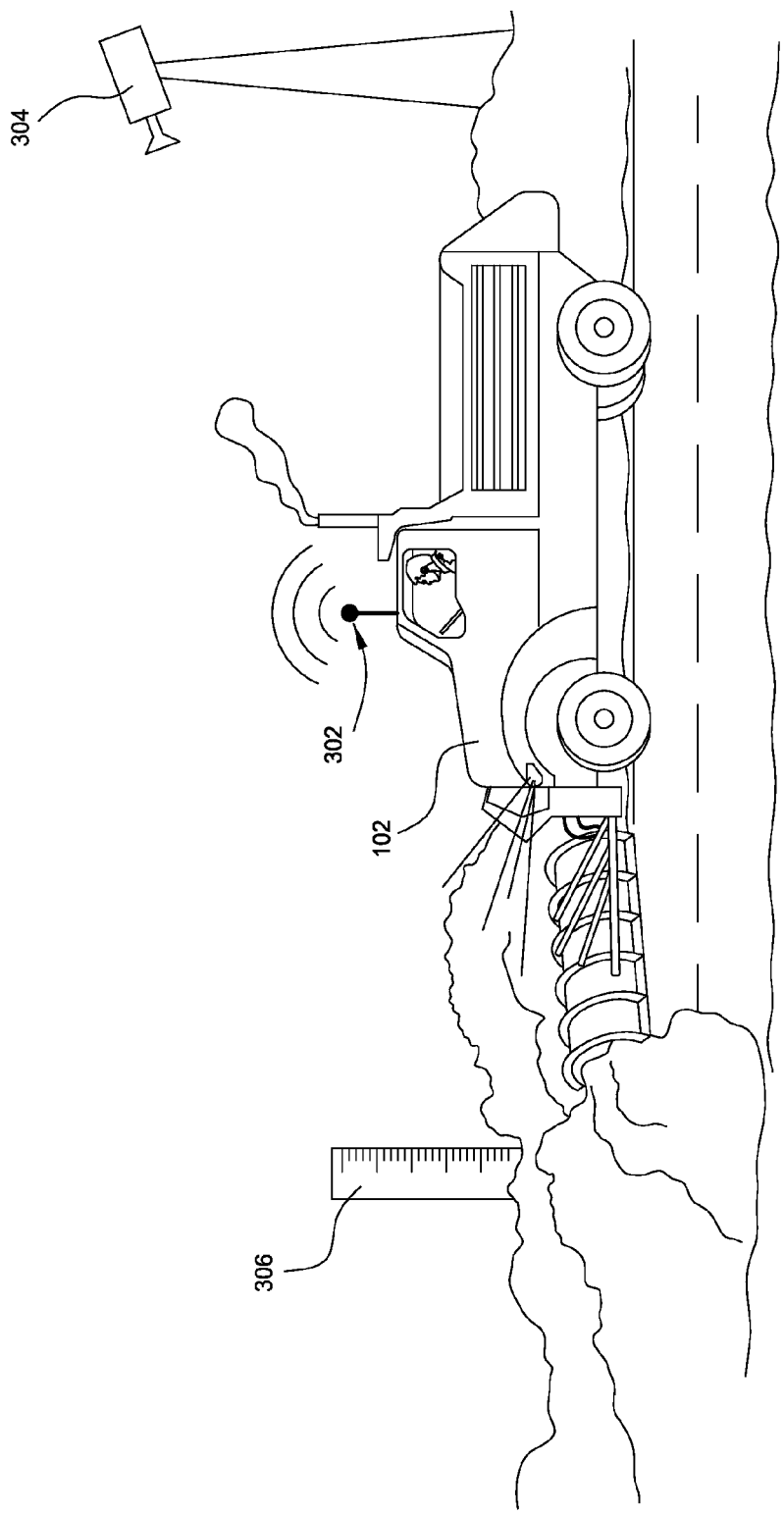
FIGS. 3A-3B illustrate tracking and monitoring the movements of a snowplow, according to one embodiment of the invention.
Figure 3B:
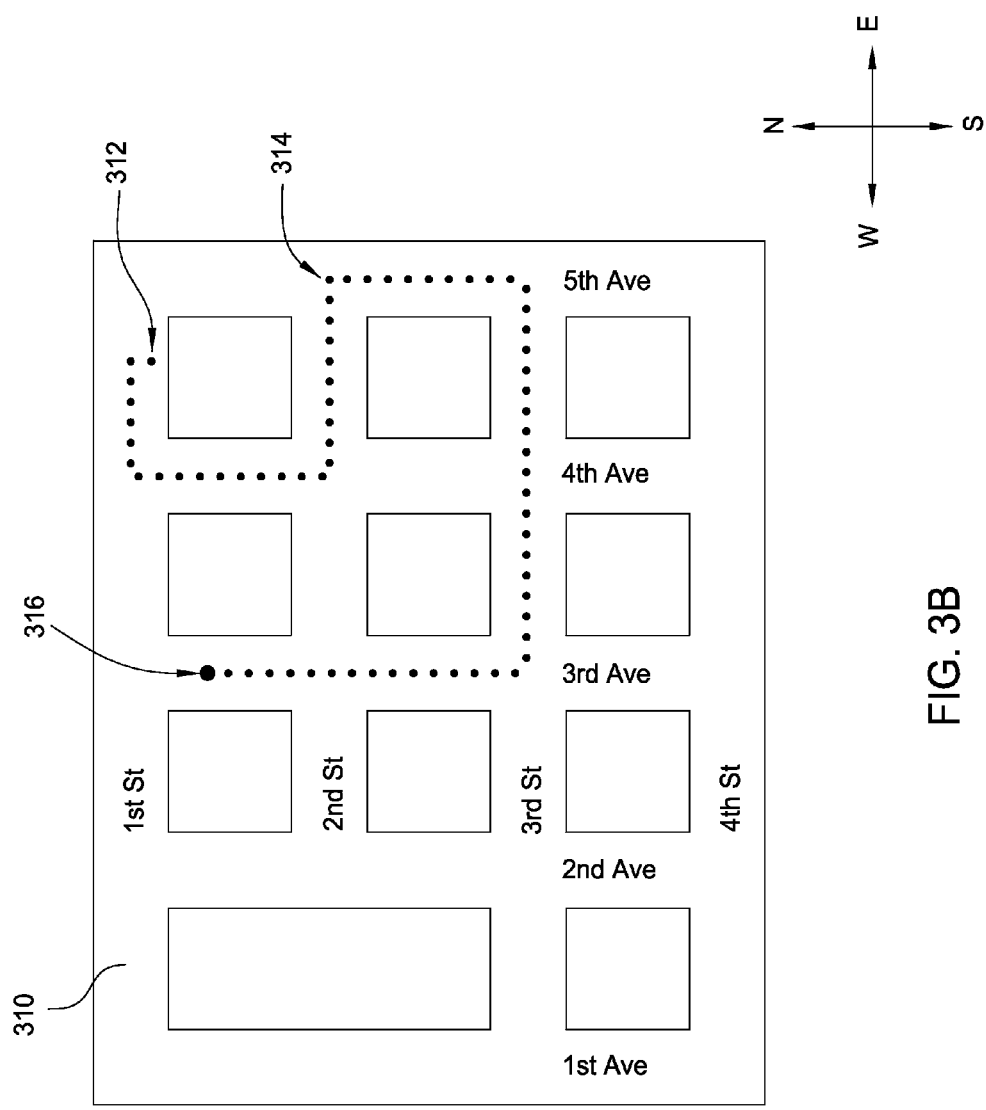

FIGS. 3A-3B illustrate tracking and monitoring the movements of a snowplow 102, according to one embodiment of the invention. In FIG. 3A, the snowplow 102 includes an antenna 302 which may be used to transmit snowplow location data 122 to the server 120. The antenna 302 may use any form of wireless communication system or protocol such as TCPI/IP, satellite communication, or radio communication to transmit the data 122. In one embodiment, the antenna 302 may transmit snowplow location data 122 that is based on GPS coordinates that record a route taken by the snowplow 102.

The camera 304 may part of a system of cameras, for example, traffic cameras, that monitor a surface street. The camera 304 may also be used to track the movements of the snowplow 102. For example, as the snowplow 102 passes into the view of the camera 304, a person monitoring the cameras may record the location of the snowplow 102. This record may then be sent to the server as snowplow location data 102. In this manner, the camera 304 acts like a checkpoint that can be used with a system of cameras to track the snowplow's movement. However, any method of tracking the snowplow's route history may be used with the embodiments described herein.

The snow measuring device 306 is an example of a device for sending the initial snow depth to the client system 150. The route planning module 154 may assume that the snow depth measured by the snow measuring device 306 is the snow depth 155 for the associated street. Moreover, the snow measuring device 306 may provide a rate that snow is falling. For example, if the route planning module 154 determines the snow depth recorded by the snow measuring device 306 at a predetermined time interval, the route planning module 154 may extrapolate a snowfall rate from the differences in the measured snow depths. The route planning module 154 may use this rate to continuously adjust the snow depth 155.

FIG. 3B illustrates a map 310 recording the snowplow location data 122. The snowplow's route 314 is illustrated by the dotted line. The route 314 begins at location 312 and ends at the snowplow's current location 316. Once the route planning module 154 receives the snowplow location data 122 (i.e., the route 314) it may reset the snow depth 155 associated with each of road section cleared by the snowplow 102.

Because a snowplow 102 typically clears only one side of the street during a pass, the snowplow location data 122 may include directional data so that the route planning module 154 may reset only the snow depth 155 associate with the portion of the street that was cleared. Additionally, for roads that have multiple lanes for each direction, it may take more than one pass before a snowplow 102 clears the snow from one side of a road. The snowplow location data 122 may also specify which particular lane the snowplow 102 has cleared. However, for the sake of clarity, it is assumed that the snowplow cleared the entire width of the surface streets associated with the route 314.

Figure 4A:
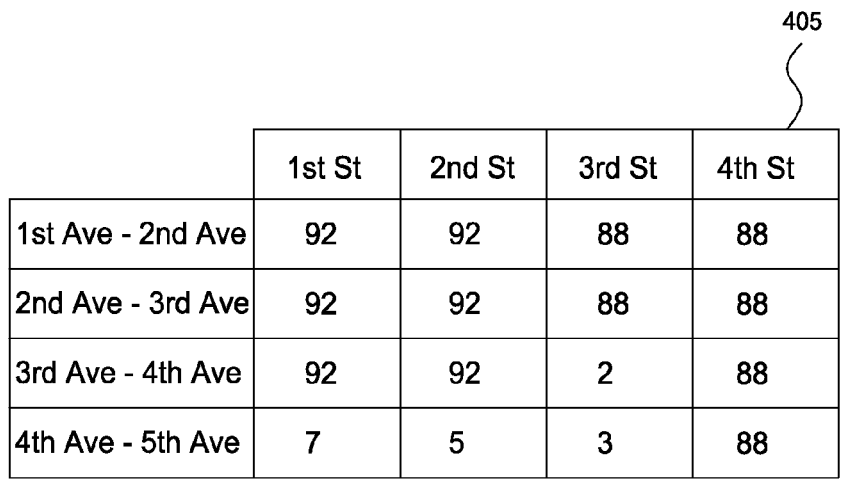
FIGS. 4A-4B are tables that assign costs to roads based on the movements of a snowplow, according to one embodiment of the invention.
Figure 4B:
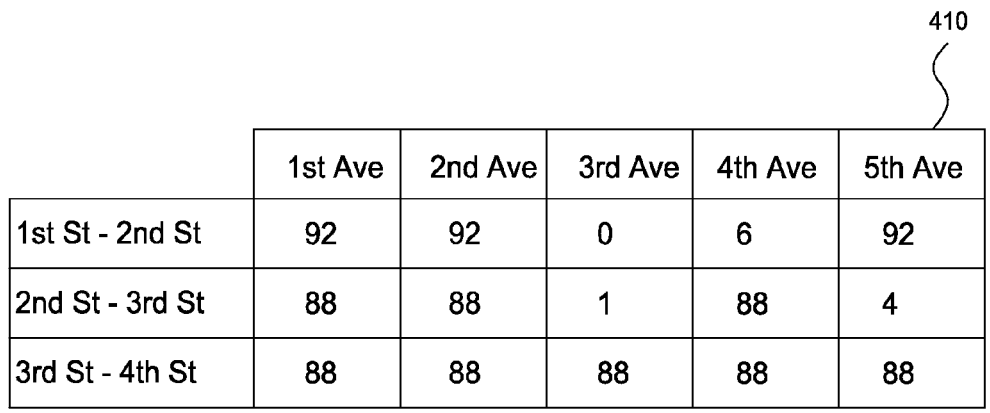

FIGS. 4A-4B are tables that assign costs to roads based on the movements of a snowplow 102, according to one embodiment of the invention. FIG. 4A illustrates an example of a table 405 that records the cost for traveling on the various streets illustrated on the map 310. These costs are based on, at least in part, the snow depth 155. The route planning module 154 may update the table 405 as new snowplow location data 122 or new snow depth data is received. Further, if snow is continuing to fall and accumulate, the route planning module 154 may update that table 405 continuously based on the snowfall rate.

In generally, table 405 divides up the surface streets within map 310 into sub-sections. Although this particular map 310 is a grid system, the invention may use any type of mapping schema that performs the functions described herein. The top row of table 405 is the horizontal streets, while the far-left column divides each horizontal street into different sections. The sections provide the granularity for mapping the snowplow's movements to the map 310. This level of granularity would not be needed if the snowplow traveled down the entire road before turning. In that case, the route planning module 154 may record a snow depth 155 and assign a cost to the entire street without dividing the street into sections. However, as shown by route 314, the snowplow 102 may turn before clearing an entire horizontal street.

The costs in table 405 are different even for the streets that have not yet been cleared. Specifically, the unplowed portions of $1^{st}$ and $2^{nd}$ Streets have higher costs than the unplowed portions of $3^{rd}$ and $4^{th}$ Streets—i.e., a cost of 92 versus a cost of 88. This may be because of environmental phenomena such as lake effect, elevation disparities, or the placement of large buildings. In general, because the geographic location of each street may affect the street's snow depths 155, each street may have different associated snow depths 155, and thus, different assigned travelling costs from a street within close proximity.

As shown, four sections of roads represented in table 405 have been cleared. Furthermore, the snowplow location data 122 may also include timestamps for each of the sections of road that record when the sections were cleared. Alternatively, the route planning module 154 may generate its own timestamps for the cleared portions. In the embodiment shown in FIG. 4A, the snow is continuing to fall, and thus, the portions of the map 310 that were cleared later in time have higher costs than portions that were cleared more recently. Recording timestamps helps when the snowplow 102 only periodically, rather than continuously, sends updates to the client system 150. The timestamps permit the route planning module 154 to reset the cleared road section and then adjust the snow depth 155 according to the timestamps. For example, the snowplow 102 more recently cleared the portion of $3^{rd}$ Street between $3^{rd}$ and $4^{th}$ Avenue than the portion of $1^{st}$ Street between $4^{th}$ and $5^{th}$ Avenue. If the route planning system 154 received these updates at one time, it would add the most new snow accumulation (based on the snowfall rate) to the road section with the oldest timestamp—i.e., $1^{st}$ Street between $4^{th}$ and $5^{th}$ Avenue. Accordingly, the route planning module 154 may dynamically update the travelling costs of the roads without continuously receiving updated snowplow location data 122. When snow is still accumulating on the roads within a geographic region, the least recently plowed section may have a greater snow depth 155, and thus, a higher cost score than a more recently plowed section.

FIG. 4B illustrates a table 410 representing the cost of travel on the vertical streets—i.e., Avenues—of map 310. Table 410 shows the vertical portions of the map 310 that were cleared by the snowplow 102. One of ordinary skill in the art will recognize, however, that the cost tables may divide a region by any method that performs the functions described herein.

Tables 405 and 410 show that the clear portions have a cost value from 1 to 7 which is based on the time the snowplow 102 cleared the street. This linear increase is based on the snowplow clearing the portions at the same rate. In other embodiments, the snowplow 102 may require a longer time period to clear one portion than another or get delayed between portions by, for example, a stoplight. In that case, the cost for one of the cleared portions may not increase at a linear rate but would rather increase in a step-wise manner.

Returning to FIG. 2, at step 215 the route planning module 154 uses the assigned traveling cost to plan a route or augment a map. When planning a route between two geographic locations, the route planning module 154 may consider the cost of travel on a particular road in snow as well as other known cost considerations such as speed limits, distance between two geographic locations, and road types (e.g., interstate, number of lanes, and the like). The route planning module 154 may then use the total cost to plan a route between the two geographic locations. In one embodiment, the route planning module 154 generates a route using surface streets with the lowest associated costs. The cost may be a total cost that includes a plurality of factors or only considers the cost of snow. That is, because of the incredible safety concerns of navigating snow-covered roads, the route planning module 154 may ignore the other factors when assigning traveling costs to the roads. Alternatively, the cost of travel calculation may be weighted such that it gives greater weight to the snow depth 155 of a road rather than, for example, a speed limit.

When using the traveling cost to augment a map, the tables 405 and 410 may be used. Each of the tables 405, 410 relate a cost value to different sections of streets found on map 310. Accordingly, the costs may then be combined with the map 310 to provide snow depth information to a user of a navigational system.

At step 220, the planned route or augmented map is displayed on a display device—e.g., display device 160. When displaying the planned route, the display may look substantially like the route 314 displayed on map 310. That is, if a user was trying to traverse between location 312 and location 316, the route planning module 154 may generate a similar route as dictated by the traveling costs. In this manner, the user may avoid any unplowed roads. In another embodiment, the route planning module 154 may recommend that the user travel west on $1^{st}$ Street before turning south on $3^{rd}$ Avenue. In this example, the cost for traveling on the unplowed portion of $1^{st}$ Street between $3^{rd}$ and $4^{th}$ Avenue is less than the cost of traveling on the plowed portions. The route planning module 154 may plan this route because the lower cost of traveling on a plowed road does not outweigh the advantages of traveling a much shorter distance. One of ordinary skill will recognize that the different factors that affect the travelling costs may be configured and weighted in a variety of ways to yield a desired result.

When displaying an augmented map, the route planning module 154 may add graphical data to the map to represent the cost of travel for a portion of the map. The graphical data may be metadata or other similar data which displays on the map, for example, a numerical value of the cost, a shaded cost gradient, highlighting, a static marker, or a flashing marker. Each of these graphical indicators aid the user to track and avoid streets with the highest cost—e.g., the greatest snow depth. For example, the shaded cost gradient may be applied to the streets on the map such that the lightest shading represents the least amount of travel cost while the darkest shading represents the greatest amount of travel cost. The same process may be done except with highlighting where, for example, a green color represents recently plowed streets while red represents impassable streets. In one embodiment, the travel cost is based solely on the current snow depth of the surface street.

Figure 5:
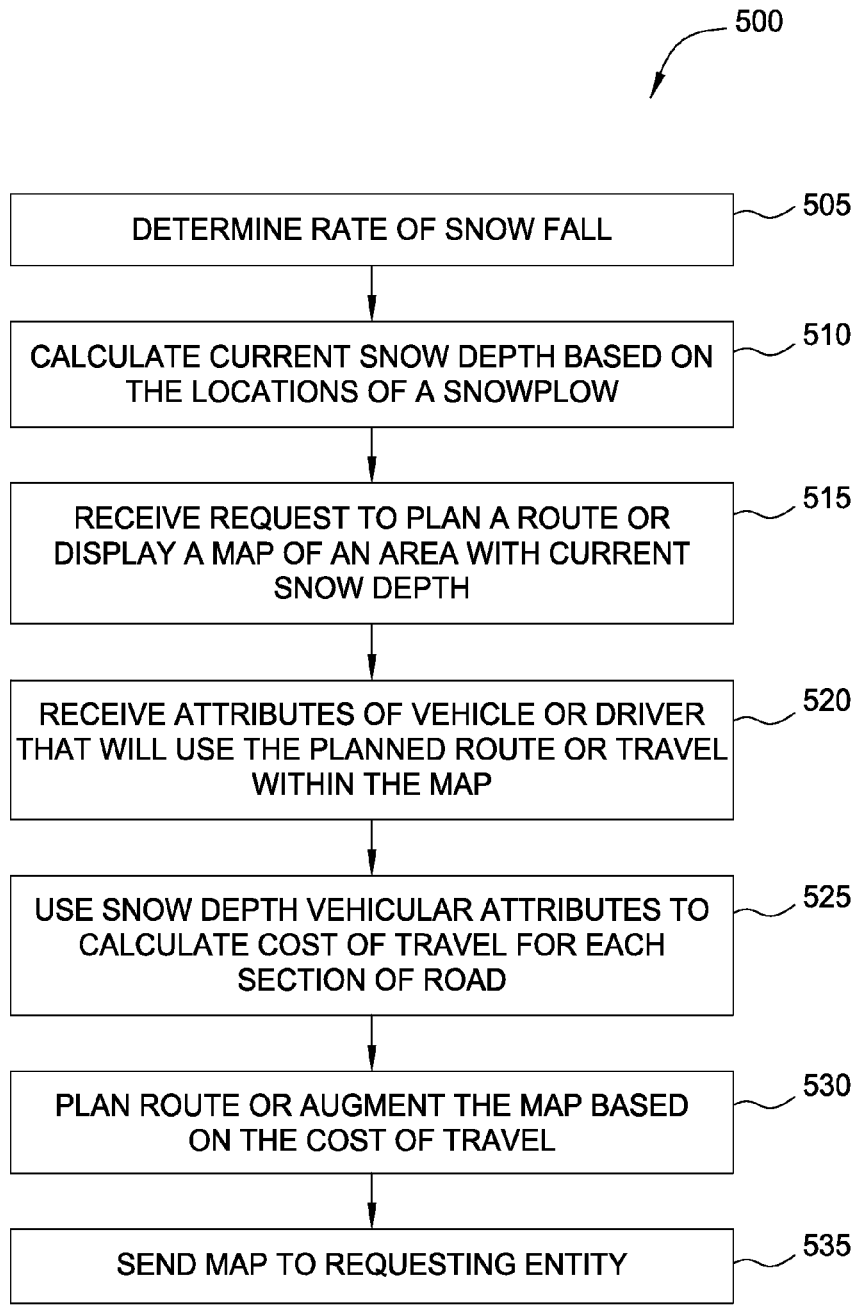
FIG. 5 is a flow diagram illustrating a method of planning a route on snow-covered roads, according to one embodiment of the invention.

FIG. 5 is a flow diagram illustrating a method 500 of planning a route on snow-covered roads, according to one embodiment of the invention. At step 505, the route planning module 154 may determine or receive the current snowfall rate for a specific geographic region. The snow fall rate enables the route planning module 154 to continuously update the snow depth 155, and thus, the cost of travelling on each of the roads within that region.

At step 510, the route planning module 154 calculates the current snow depth based on the locations of a snowplow 102. The route planning module 154 may receive snowplow location data 122 from the server 120 which then may be used to reset the snow depth 155 associated with any streets that have been plowed. If the updated snowplow location data 122 is not continuously transmitted to the client system 150, timestamps associated with the cleared road sections may permit the route planning module 154 to add to the reset snow depth 155 any additional snow that has fallen after the road was cleared.

At step 515, the client system 150 may receive a request from a user to plan a route or display a map of an area with snow covered surface streets. To do so, the route planning module 154 develops a cost of travel on each of the roads within the geographic region. However, the cost of travel may be decreased or increased based on attributes of the vehicle that will traverse the region.

At step 520, the route planning module 154 receives attributes of the vehicle or driver that will use the planned route or travel within the augmented map. For example, the route planning module 154 may prompt the user to enter in the vehicle's attributes or a driver's experience.

Different vehicles perform differently on snow-covered roads. Accordingly, the route planning module 154 may use the different aspects of a vehicle that determine how capable it is at navigating snow-covered roads when determining travelling costs. Examples of these aspects include the drive system of the vehicle, a vehicle's clearance, a vehicle type, a weight of the vehicle, whether the user vehicle is equipped with snow tires or snow chains, and the like.

The drive system of the vehicle includes the number of tires or the number of powered wheels. For example, a two-wheeled motorcycle and bicycle offer much less stability on snow than a four-wheeled vehicle or even a three-wheeled motorcycle. Further, a four-wheel drive vehicle or all-wheeled drive vehicle may perform better than a two-wheel drive vehicle. The route planning module 154 may also distinguish between a front-wheel drive vehicle and a rear-wheel drive vehicle.

The vehicle's clearance may also be considered when assigning a cost of travel for a particular vehicle on a particular road. The clearance may be adequately measured by the distance between the body of the car and the ground, or a diameter of the vehicle's tires. Typically, vehicles with a high clearance prevent the vehicle's body from becoming high-centered on a snow-covered road.

The vehicle type may also be considered, such as whether the vehicle is a truck, a semi-trailer truck, a sport utility vehicle, a sport coupe, etc. Each of these individual types may be assigned a particular cost. Additionally, the cost may be assigned by the manufacturer and make of the vehicle. Further, the particular equipment for the vehicle may be considered such as snow tires, snow chains, and the like. One of ordinary skill will recognize the variety of vehicular attributes that may be considered when determining a vehicle's ability to navigate snow-covered roads.

The route planning module 154 may use one or more of the vehicular attributes to alter the travel cost for each of the roads within the region. For example, if the cost based solely on snow depth for a section of road is 50, the cost if the vehicle is a four-wheel drive truck may be 55 while the cost for a rear-wheel drive sports coupe is 80. Alternatively, the vehicular attributes may be used to both decrease and increase the travel cost. For example, a four-wheel drive truck with a twenty inch clearance may decrease the cost while a sports coupe with a four inch clearance may increase the cost.

At step 530, the route planning module 154 plans the route or augments the map according to the cost of travel determined by both the snow depth 155 and the vehicular attributes. The planned route and augmented map may be similar to those described in step 220 of FIG. 2.

In another embodiment, the route planning module 154 may also consider the terrain of the road. Generally, the terrain can affect the navigability of a snow-covered road. The route planning module 154 may consider the slope (or gradient), density of the curves, or maximum curvature of the road. For example, a road with a steep slope or a large number of curves may increase the cost for traveling on the road when the road is covered by frozen precipitation. Additionally, a road with a particular sharp curve may be given a cost value that discourages the user from using the road.

In another embodiment, the route planning module 154 may consider the driver's experience as a factor in the cost evaluation. The route planning module 154 may assign a lesser cost to a road when planning a route for a driver that has previously driven on snow relative to a driver that has never driven on snow.

At step 535, the route planning module 154 transmits the planned route or augmented map to the requesting entity for display.

In general, techniques are described for using geographic location data of snowplows to update a snow depth associated with a section of a surface street. The route of the snowplow may be tracked continuously which allows the snow depth of the street to be reset in real-time. The updated snow depth may then be used to generate a cost of travelling on the street. The travelling cost may then be used to plan a route through the region. Alternatively, the cost may be graphically displayed on a map to permit a user to determine which surface streets to avoid. In another embodiment, the cost of travelling on a particular street may be changed by the attributes of the vehicle that will navigate the snow-covered roads, driver's experience, or the geographic terrain of a road. This new cost may then be used to plan a route or display roads to avoid.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product comprising:
   a computer-readable storage medium having computer-readable program code embodied therewith, the computer-readable program code comprising:
      computer-readable program code configured to:
         estimate a current depth of frozen precipitation on a portion of a surface based on an accumulation rate of the frozen precipitation;

receive location data associated with a vehicle, wherein the vehicle is equipped to remove frozen precipitation from the surface;

upon determining based on the received location data that the vehicle has passed over the portion of the surface, reset the estimate of the current depth of the frozen precipitation on the portion of the surface;

adjusting the estimate of the current depth to yield an adjusted depth of the frozen precipitation based on a received indicator of traffic density on the portion of the surface, the adjusted depth accounting for a compactness of the frozen precipitation;

generate a traveling cost for the portion of the surface based on the adjusted depth; and transmit for display at least one of: (i) map data that associates the traveling cost to a particular geographic location and (ii) a planned route based on the traveling cost.

2. The computer program product of claim 1, wherein the planned route includes the portion of the surface associated with the traveling cost and further comprising receiving a request to plan a route between at least two geographic points.

3. The computer program product of claim 1, wherein the map displays the traveling cost using a visual indicator, the visual indicator is at least one of:
a numerical value, a shaded cost gradient, highlighting, a static marker, and a flashing marker.

4. The computer program product of claim 1, further comprising:
receiving an attribute of a user vehicle associated with a user of the display device, wherein the attribute affects a performance of the user vehicle on a surface covered by the frozen precipitation; and
updating the traveling cost based on the received attributes.

5. The computer program product of claim 4, wherein the received attributes are at least one of: a drive system of the user vehicle, a user vehicle type, a weight of the user vehicle, a clearance of the user vehicle, and whether the user vehicle is equipped with snow tires or snow chains.

6. The computer program product of claim 1, wherein the vehicle includes a plow configured to remove the frozen precipitation from the surface, and wherein the location data includes a historical route taken by the vehicle while the vehicle was removing the frozen precipitation with the plow.

7. A system, comprising:
a computer processor; and
a memory containing a program that, when executed on the computer processor, performs an operation for processing data, comprising:
estimate a current depth of frozen precipitation on a portion of a surface based on an accumulation rate of the frozen precipitation;
receiving location data associated with a vehicle, wherein the vehicle is equipped to remove frozen precipitation from the surface;
upon determining based on the received location data that the vehicle has passed over the portion of the surface, reset the estimate of the current depth of the frozen precipitation on the portion of the surface;
adjusting the estimate of the current depth to yield an adjusted depth of the frozen precipitation based on a received indicator of traffic density on the portion of the surface, the adjusted depth accounting for a compactness of the frozen precipitation;
generating a traveling cost for the portion of the surface based on the adjusted depth; and
transmitting for display at least one of: (i) map data that associates the traveling cost to a particular geographic location and (ii) a planned route based on the traveling cost.

8. The system of claim 7, wherein the planned route includes the portion of the surface associated with the traveling cost and further comprising receiving a request to plan a route between at least two geographic points.

9. The system of claim 7, further comprising:
receiving an attribute of a user vehicle associated with a user of the display device, wherein the attribute affects a performance of the user vehicle on a surface covered by the frozen precipitation; and
updating the traveling cost based on the received attributes.

10. The system of claim 9, wherein the received attributes are at least one of: a drive system of the user vehicle, a user vehicle type, a weight of the user vehicle, a clearance of the user vehicle, and whether the user vehicle is equipped with snow tires or snow chains.

11. The computer program product of claim 4, wherein resetting the estimate of the current depth of the frozen precipitation comprises selecting a reset value of the estimate of the current depth based on a surface texture of the portion of the surface, wherein different surface textures correspond to different reset values of the estimate of the current depth.

12. The computer program product of claim 4, wherein the received location data associated with the vehicle includes directional data indicating the direction the vehicle traveled, further comprising computer-readable program code configured to:
determine, based on the directional data, a lane of the portion of the surface traversed by the vehicle, wherein only the estimate of the current depth of the frozen precipitation on the lane is reset.

13. The system of claim 7, wherein resetting the estimate of the current depth of the frozen precipitation comprises selecting a reset value of the estimate of the current depth based on a surface texture of the portion of the surface, wherein different surface textures correspond to different reset values of the estimate of the current depth.

14. The system of claim 7, wherein the received location data associated with the vehicle includes directional data indicating the direction the vehicle traveled, wherein the operation further comprises:
determining, based on the directional data, a lane of the portion of the surface traversed by the vehicle, wherein only the estimate of the current depth of the frozen precipitation on the lane is reset.

* * * * *